(12) United States Patent
Yang et al.

(10) Patent No.: US 8,935,736 B2
(45) Date of Patent: Jan. 13, 2015

(54) CHANNEL SWITCHING METHOD, CHANNEL SWITCHING DEVICE, AND CHANNEL SWITCHING SYSTEM

(75) Inventors: Peilin Yang, Nanjing (CN); Jun Li, Shenzhen (CN); Xia Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/158,068

(22) Filed: Jun. 10, 2011

(65) Prior Publication Data

US 2011/0258674 A1     Oct. 20, 2011

Related U.S. Application Data

(63) Continuation of application No. PCT/CN2009/073132, filed on Aug. 6, 2009.

(30) Foreign Application Priority Data

Dec. 12, 2008   (CN) .......................... 2008 1 0218385
Jan. 21, 2009   (CN) .......................... 2009 1 0004013

(51) Int. Cl.
*H04N 7/173*       (2011.01)
*H04N 21/266*      (2011.01)
(Continued)

(52) U.S. Cl.
CPC ..... *H04N 21/26616* (2013.01); *H04N 21/4384* (2013.01); *H04N 21/6405* (2013.01); *H04N 21/6408* (2013.01); *H04L 65/4076* (2013.01)
USPC .................... 725/94; 725/86; 725/87; 725/93

(58) Field of Classification Search
None
See application file for complete search history.

(56) References Cited

U.S. PATENT DOCUMENTS 5,818,439 A    10/1998  Nagasaka et al.
6,973,081 B1   12/2005  Patel
(Continued)

FOREIGN PATENT DOCUMENTS

CN    1606352 A    4/2005
CN    1750643 A    3/2006
(Continued)

OTHER PUBLICATIONS

Written Opinion of the International Searching Authority dated Nov. 12, 2009 in connection with International Patent Application No. PCT/CN2009/073132.
(Continued)

*Primary Examiner* — Nasser Goodarzi
*Assistant Examiner* — Fred Peng

(57) ABSTRACT

A channel switching method, a channel switching device, and a channel switching system are provided. The method includes that: a network buffer apparatus determines whether a buffered video stream burst in unicast is synchronous with a channel video stream pushed by a network node to a client in multicast; notifies the client of sending a request for joining a multicast group, so as to implement fast channel switching; and dynamically adjusts the speed of pushing the video stream in unicast, so that the number of concurrent connections of the client and the channel switching efficiency are increased, and the deployment and operation cost of an Internet Protocol Television (IPTV) system is decreased. In this case, the channel switching scheme achieves universality and expandability, and the level of user experience is improved.

11 Claims, 4 Drawing Sheets

(51) Int. Cl.
*H04N 21/438* (2011.01)
*H04N 21/6405* (2011.01)
*H04N 21/6408* (2011.01)
*H04L 29/06* (2006.01)

(56) References Cited

U.S. PATENT DOCUMENTS

| | | | |
|---|---|---|---|
| 6,973,667 B2 | 12/2005 | Fritsch | |
| 7,430,222 B2 | 9/2008 | Green et al. | |
| 7,525,965 B1 | 4/2009 | St. Pierre et al. | |
| 7,668,914 B2 | 2/2010 | Parker et al. | |
| 7,818,775 B2 | 10/2010 | Chen et al. | |
| 7,904,581 B2 | 3/2011 | Sherer et al. | |
| 7,944,863 B2 | 5/2011 | Smith et al. | |
| 7,965,771 B2 | 6/2011 | Wu et al. | |
| 7,974,200 B2* | 7/2011 | Walker et al. | 370/235 |
| 7,992,163 B1* | 8/2011 | Jerding et al. | 725/28 |
| 8,037,504 B2* | 10/2011 | Jerding et al. | 725/91 |
| 8,037,506 B2* | 10/2011 | Cooper et al. | 725/93 |
| 8,056,106 B2* | 11/2011 | Rodriguez et al. | 725/88 |
| 8,145,778 B2 | 3/2012 | Pickens et al. | |
| 8,291,103 B1 | 10/2012 | Reister | |
| 2002/0066109 A1* | 5/2002 | Tam et al. | 725/106 |
| 2002/0114330 A1 | 8/2002 | Cheung et al. | |
| 2004/0153951 A1 | 8/2004 | Walker et al. | |
| 2005/0081244 A1 | 4/2005 | Barrett et al. | |
| 2005/0190781 A1 | 9/2005 | Green et al. | |
| 2006/0020995 A1 | 1/2006 | Opic et al. | |
| 2006/0080724 A1 | 4/2006 | Vermeiren et al. | |
| 2006/0136581 A1* | 6/2006 | Smith | 709/224 |
| 2006/0222323 A1 | 10/2006 | Sharpe et al. | |
| 2006/0268917 A1 | 11/2006 | Nadarajah | |
| 2007/0107026 A1 | 5/2007 | Sherer et al. | |
| 2007/0130601 A1 | 6/2007 | Li et al. | |
| 2007/0147344 A1 | 6/2007 | Sundqvist et al. | |
| 2007/0192812 A1 | 8/2007 | Pickens et al. | |
| 2007/0242668 A1 | 10/2007 | Barrett | |
| 2007/0266398 A1 | 11/2007 | Vandaele | |
| 2007/0266403 A1 | 11/2007 | Ou et al. | |
| 2007/0277219 A1 | 11/2007 | Toebes et al. | |
| 2008/0062990 A1 | 3/2008 | Oran | |
| 2008/0192839 A1 | 8/2008 | Gahm et al. | |
| 2008/0201752 A1 | 8/2008 | Liu et al. | |
| 2008/0282301 A1* | 11/2008 | Liu et al. | 725/100 |
| 2009/0055540 A1 | 2/2009 | Foti et al. | |
| 2009/0063681 A1 | 3/2009 | Ramakrishnan et al. | |
| 2009/0248886 A1 | 10/2009 | Tan et al. | |
| 2009/0265743 A1 | 10/2009 | Gao | |
| 2009/0282444 A1 | 11/2009 | Laksono et al. | |
| 2010/0043022 A1 | 2/2010 | Kaftan | |
| 2010/0058405 A1 | 3/2010 | Ramakrishnan et al. | |
| 2010/0111108 A1 | 5/2010 | Akgul et al. | |
| 2010/0131995 A1 | 5/2010 | Guo et al. | |
| 2010/0254462 A1 | 10/2010 | Friedrich et al. | |
| 2010/0265946 A1 | 10/2010 | Huang et al. | |
| 2011/0075663 A1 | 3/2011 | Serbest | |
| 2011/0154415 A1 | 6/2011 | Kim | |
| 2011/0164614 A1 | 7/2011 | Begeja | |
| 2011/0219414 A1 | 9/2011 | Guo et al. | |
| 2011/0239262 A1 | 9/2011 | Yang et al. | |
| 2012/0017255 A1 | 1/2012 | Nadarajah | |

FOREIGN PATENT DOCUMENTS

| | | |
|---|---|---|
| CN | 1783831 A | 6/2006 |
| CN | 1842160 A | 10/2006 |
| CN | 1881925 A | 12/2006 |
| CN | 1996813 A | 7/2007 |
| CN | 101047838 A | 10/2007 |
| CN | 101132521 A | 2/2008 |
| CN | 101267538 A | 9/2008 |
| EP | 1 523 190 A1 | 4/2005 |
| EP | 1 708 506 A2 | 10/2006 |
| JP | 2006287926 A | 10/2006 |
| WO | WO 2006/091736 A2 | 8/2006 |
| WO | WO 2007/120245 A1 | 10/2007 |
| WO | WO 2008/033644 A2 | 3/2008 |
| WO | WO 2008/100725 A2 | 8/2008 |

OTHER PUBLICATIONS

Partial Translation of Office Action dated Nov. 3, 2011 in connection with Chinese Patent Application No. 2009100040135.
Jun Sun, "Researches on the improvement of channel zapping time in IPTV service", Apr. 2007, 4 pages.
O. Levin, et al., "Extensions to RTCP Feedback Mechanism for Burst Streaming", Oct. 27, 2008, 30 pages.
B. Ver Steeg, et al., "Unicast-Based Rapid Synchronization with RTP Multicast Sessions", Mar. 9, 2009, 62 pages.
B. Ver Steeg, et al., Unicast-Based Rapid Acquisition of Multicast RTP Sessions, Jun. 2011, 113 pages.
European Search Report dated Jan. 27, 2012 in connection with European Patent Application No. EP 11 17 6168.
Communication and Extended European Search Report dated May 14, 2012 in connection with European Patent Application No. 09 831 412.3.
Partial translation of Office Action dated May 4, 2012 in connection with Chinese Patent Application No. 200910004013.5.
International Search Report dated Nov. 12, 2009 in connection with International Patent Application No. PCT/CN2009/073132.
Office Action dated Apr. 5, 2013 in connection with U.S. Appl. No. 13/158,217.
H. Schulzrinne, et al., RTP: A Transport Protocol for Real-Time Applications, Network Working Group, Jul. 2003, 93 pages.
J. Chesterfield, et al., "RTCP Extensions for Single-Source Multicast Sessions with Unicast Feedback", Mar. 6, 2006, 55 pages.
J. Rey, et al., "RTP Retransmission Payload Format", Network Working Group, Jul. 2006, 32 pages.
J. Ott, et al., "Extended RTP Profile for Real-time Transport Control Protocol (RTCP)-Based Feedback (RTP/AVPF)", Network Working Group, Jul. 2006, 51 pages.
European Search dated Nov. 29, 2012 in connection with EuropeanPatent Application 11176168.0, 5 pages.
Office Action dated Nov. 8, 2012 in connection with U.S. Appl. No. 13/158,217, 15 pages.

* cited by examiner

CHANNEL SWITCHING METHOD, CHANNEL SWITCHING DEVICE, AND CHANNEL SWITCHING SYSTEM

CROSS-REFERENCE TO RELATED APPLICATIONS

This application is a continuation of International Application No. PCT/CN2009/073132, filed on Aug. 6, 2009, which claims priority to Chinese Patent Application No. 200810218385.3, filed on Dec. 12, 2008 and Chinese Patent Application No. 200910004013.5, filed on Jan. 21, 2009, all of which are hereby incorporated by reference in their entireties.

TECHNICAL FIELD

The present invention relates the field of communications technologies, and in particular, to a channel switching method, a channel switching device, and a channel switching system.

BACKGROUND

The Internet Protocol Television (IPTV) is a new technology of providing home users with multiple interactive services including digital services by using a broadband wired network integrated with various technologies such as Internet, multimedia, and communication technologies. With the increasing of popularity, the IPTV is recognized worldwide. However, a great delay during the channel switching of the IPTV is always a problem with which users and operators of the IPTV are obsessed.

The channel switching delay may be caused by the following factors: a time taken by leaving an original channel multicast group, a time taken by joining a new channel multicast group, a time taken by a Set Top Box (STB) to buffer filled data, and a time taken by waiting for an I frame. The time taken by waiting for the I frame is the main factor.

The IPTV generally encodes a picture as an image sequence composed of the I frame, a P frame, and a B frame by using a video and audio compression encoding algorithm. The I frame is a frame thoroughly encoded for the whole picture, can be independently decoded and displayed, and provides reference for decoding of the relevant P frame and B frame. The P frame cannot be independently decoded or displayed, and can be decoded and displayed only after the I frame or a previous P frame referred to is received. The B frame cannot be independently decoded or displayed either, and can be decoded and displayed only after a previous frame (I frame or P frame) and a next frame (P frame) referred to are received. The P frame and the B frame mainly describe the difference between frames, so the P frame and the B frame have higher encoding efficiency than the I frame.

In the prior art, before channel switching, a buffer apparatus is required to buffer a multimedia data stream corresponding to an IPTV channel. During channel switching, a terminal initiates a session to request an I frame or a Group of Picture (GOP) from the buffer apparatus and join a multicast group corresponding to a destination channel at the same time, in which the GOP includes the I frame; the buffer apparatus pushes the I frame or the GOP to the terminal in unicast, and the terminal buffers the obtained I frame or GOP and starts to decode and display a received image sequence; and when the terminal finds that the I frame or GOP obtained from the buffer apparatus is repetitive with a multicast stream of the channel, the terminal stops obtaining the I frame or GOP from the buffer apparatus.

During the research and practice of the prior art, the inventors find that the prior art has the following problems.

(1) In the prior art, the terminal initiates a request for joining the multicast group. If the terminal joins the multicast group too early, two streams may be sent in one period of time, that is, one is a unicast stream and the other is a multicast stream, so that a packet easily gets lost and the processing time of the buffer apparatus is long, thereby affecting the efficiency; while if the terminal joins the multicast group too late, the time for the network buffer apparatus to process the channel switching of a single user is too long, which affects the concurrent number of processes performed by the network buffer apparatus on fast channel switching at the same moment, and reduces the efficiency.

(2) According to the scheme in the prior art, when the unicast stream is received, a transfer speed is negotiated between the terminal and the buffer apparatus, so that the time for the buffer apparatus to process the single channel switching is increased, and the transmission efficiency of the unicast stream is decreased.

SUMMARY

Embodiments of the present invention provide a channel switching method, a channel switching device, and a channel switching system, which reduce the time of channel switching.

An embodiment of the present invention provides a channel switching method, where the method includes:

sending a channel switching request to a network buffer apparatus to request switching to a second channel;

receiving and detecting a buffered video stream of the second channel sent by the network buffer apparatus, and feeding back a detection result to the network buffer apparatus, so that the network buffer apparatus dynamically adjusts a sending speed of sending the buffered video stream to a client according to the detection result;

sending a request for joining a multicast group of the second channel to a network node; and receiving a video stream of the second channel sent by the network node.

An embodiment of the present invention provides another channel switching method, where the method includes:

buffering a video stream of a channel;

receiving a channel switching request for switching to a second channel sent by a client;

pushing a buffered video stream of the second channel to the client according to the channel switching request; and determining whether the pushed buffered video stream is synchronous with a video stream of the second channel, and if the pushed buffered video stream is synchronous with the video stream of the second channel, sending a notification message to the client to notify the client of sending a request for joining a multicast group of the second channel.

An embodiment of the present invention provides a channel switching device, where the device includes:

a sending module, configured to send a channel switching request to a network buffer apparatus to request switching to a second channel, or send a request for joining a multicast group of the second channel to a network node;

a receiving module, configured to receive a video stream of the second channel buffered by the network buffer apparatus according to the channel switching request sent by the sending module, or receive a video stream of the second channel sent by the network node according to the request for joining the multicast group sent by the sending module; and a detection module, configured to detect the buffered video stream after the receiving module receives the video stream buffered by the network buffer apparatus, and feed back a detection result to the network buffer apparatus, so that the network buffer apparatus dynamically adjusts a sending speed of sending the buffered video stream to a client according to the detection result.

An embodiment of the present invention provides another channel switching device, where the device includes:

a buffering module, configured to buffer a video stream of a channel;

a receiving module, configured to receive a channel switching request for switching to a second channel sent by a client;

a pushing module, configured to push the buffered video stream to the client according to the channel switching request sent by the receiving module;

a first determination module, configured to determine whether the buffered video stream pushed by the pushing module is synchronous with the video stream of the channel; and a first notification module, configured to send a notification message to the client to notify the client of sending a request for joining a multicast group, when the determination module determines that the pushed buffered video stream is synchronous with the video stream of the channel.

An embodiment of the present invention provides a channel switching system, where the system includes:

a network buffer apparatus, configured to buffer a video stream of a channel, receive a channel switching request sent by a client, push the buffered video stream to the client according to the channel switching request, receive a detection result fed back from the client, and dynamically adjust a sending speed of sending the buffered video stream to the client; and a client, configured to send the channel switching request to the network buffer apparatus to request switching to the second channel, receive and detect the buffered video stream of the second channel sent by the network buffer apparatus, feed back a detection result to the network buffer apparatus, send a request for joining a multicast group of the second channel to a network node, and receive a video stream of the second channel sent by the network node.

An embodiment of the present invention provides another channel switching system, where the system includes:

a network buffer apparatus, configured to buffer a video stream of a channel; receive a channel switching request for switching to a second channel sent by a client; push the buffered video stream to the client according to the channel switching request; and determine whether the pushed buffered video stream is synchronous with the video stream of the channel, and send a notification message to the client to notify the client of sending a request for joining a multicast group if the pushed buffered video stream is synchronous with the video stream of the channel;

a client, configured to send the channel switching request to the network buffer apparatus, receive the buffered video stream pushed by the network buffer apparatus, and send the request for joining the multicast group to a network node according to a notification from the network buffer apparatus to request joining the multicast group; and the network node, configured to send the video stream of the channel to the client according to the request for joining the multicast group sent by the client.

The embodiments of the present invention provide the channel switching method, the channel switching device, and the channel switching system. The network buffer apparatus determines whether the buffered video stream burst in unicast is synchronous with the video stream of the channel pushed from the network node to the client in multicast, so as to implement fast channel switching, and dynamically adjusts the speed of pushing the video stream in unicast, so that the number of concurrent connections of the client and the channel switching efficiency are increased, and the deployment and operation cost of an IPTV system is decreased. In this case, the channel switching scheme achieves universality and expandability, and the level of user experience is improved.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

The technical solutions of the embodiments of the present invention are described in the following clearly with reference to the accompanying drawings. Apparently, the embodiments in the following descriptions are merely a part of the embodiments of the present invention, rather than all of the embodiments of the present invention. Persons of ordinary skill in the art can derive other embodiments based on the embodiments of the present invention without creative efforts, which all fall within the protection scope of the present invention.

Figure 1A:
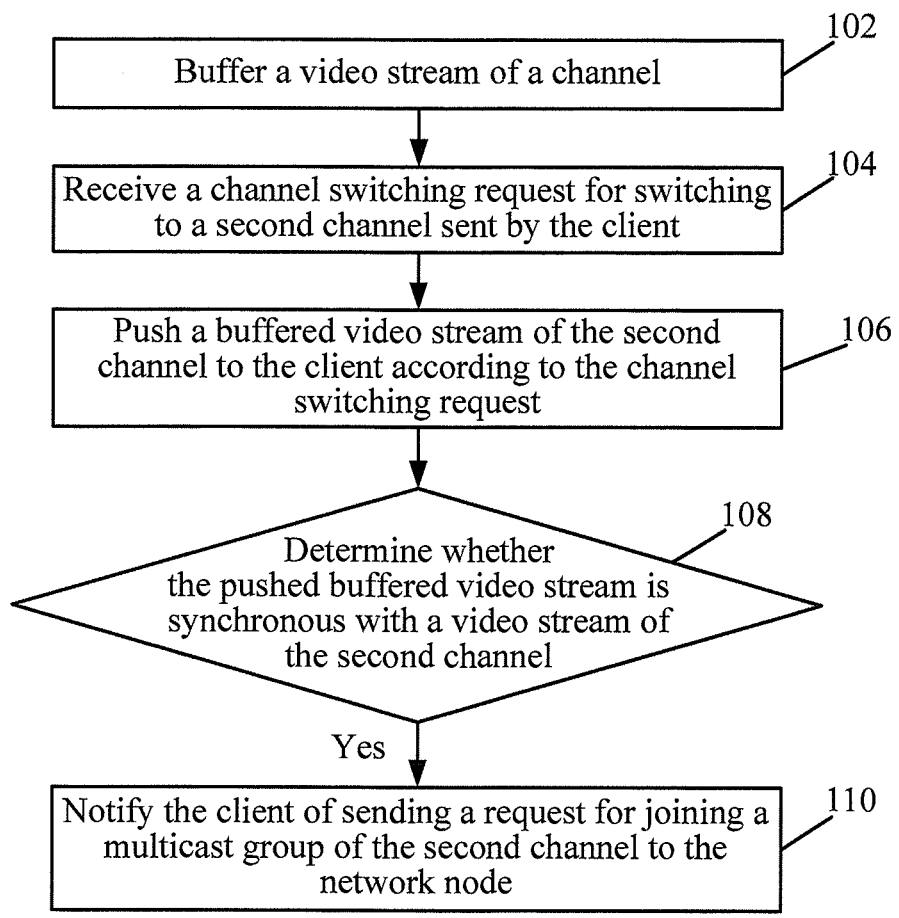
FIG. 1a is a flow chart of a channel switching method according to an embodiment of the present invention.

FIG. 1a is a flow chart of a channel switching method according to an embodiment of the present invention. The channel switching method includes the following steps.

Step 102: Buffer a video stream of a channel.

Specifically, a video stream sent from a head-end apparatus to a client through a network node is buffered. The head-end is a source apparatus initiating a media stream of the channel, and the types of the head-end may include a multicast source, a media server, a center media server, and an edge media server. A mode for the head-end to obtain a media stream includes recording from a satellite television or forwarding from other wired networks. The network node includes apparatuses deployed by an operator, such as a Digital Subscriber Line Access Multiplexer (DSLAM) apparatus, an Optical Line Terminal (OLT) apparatus, a router apparatus, a network access server, and an Internet Protocol (IP) switch. The network connection between the head-end and the network node may be implemented through a core network, a Metropolitan Area Network (MAN), or an aggregation network, or by other networking means.

A network buffer apparatus buffers the video stream sent from the head-end to the client, and marks a starting location of the buffered video stream capable of being independently decoded by the client in the buffer, that is, an intra-frame location, such as an I frame location or IDR frame location.

When the head-end apparatus sends the video stream to the client (which can be understood as when the head-end sends the video stream to the client through the network node), the network buffer apparatus obtains and buffers the video stream, or when the head-end sends the video stream to the client, the network buffer apparatus obtains and buffers the video stream by mirroring, in which the video stream is a code stream of the channel provided for a user.

Step 104: Receive a channel switching request for switching from a first channel to a second channel sent by the client.

When the user intends to switch the channel, the client sends the channel switching request to the network node to request switching to a channel required by the user. The channel switching request may use a Real-time Transport Control Protocol (RTCP), an RTCP extension protocol, or other dedicated or private protocols or signaling.

In this embodiment and the following embodiments, the switching from the first channel to the second channel is taken as an example for description, but this embodiment is not limited thereto. For example, the switching process may also be started by the terminal, and the first channel does not exist.

Step 106: Push a buffered video stream of the second channel to the client according to the channel switching request.

After querying a closest packet capable of being independently decoded by the terminal, the network buffer apparatus bursts the buffered video stream in unicast to the client. The unicast mode may be a User Datagram Protocol (UDP) mode.

The network buffer apparatus queries the packet that is closest to the buffered video stream and capable of being independently decoded by the client. Because different video encoding technologies exist, the channel content may be encoded through Moving Pictures Experts Group (MPEG) 2, MPEG4, H.264, or even SVC, and a transport encapsulation format of the channel content may be MPEG2 TS encapsulation or Network Abstraction Layer (NAL) encapsulation. In the embodiment of the present invention, the closest packet capable of being independently decoded by the client may be distinguishably defined for different encoding technologies and different transport encapsulation formats. For example, for an MPEG2 TS encapsulated video, the packet capable of being independently decoded by the client may be defined as a GOP starting packet.

Step 108: Determine whether the pushed buffered video stream is synchronous with a video stream of the second channel.

Step 110: If the pushed buffered video stream is synchronous with the video stream of the second channel, send a notification message to the client to notify the client of sending a request for joining a multicast group of the second channel.

Before the notification message is sent to the client, a sending speed of pushing the buffered video stream of the second channel to the client is decreased, or after the notification message is sent, the sending speed of pushing the buffered video stream of the second channel to the client is decreased.

The client sends a message of stopping pushing the video stream after receiving the video stream of the channel, in which the message carries information capable of confirming a packet not sent between the multicast video stream of the second channel and the buffered video stream of the second channel received by the client, for example, a sequence number of a first packet in the received video stream of the second channel (a multicast IP packet), or other information capable of confirming from which packet the client starts to receive the video stream of the second channel (the multicast IP packet), so that the network buffer apparatus may know how many packets between the multicast video stream and the buffered video stream received by the client are not sent. After pushing all these packets, the network buffer apparatus stops pushing the buffered video stream.

The buffered video stream is a video stream (or a unicast IP packet) burst in unicast by the network buffer apparatus to the client, and the video stream of the channel is a media stream (or a multicast IP packet) normally sent from the network node to the client in multicast.

The notification message includes any one or a combination of multicast group address information of the second channel, time information for joining the second channel, and time information for requesting stopping pushing the video stream. The client processes according to the notification message, or after the network buffer apparatus notifies the client of sending the request for joining the multicast group of the second channel, the network buffer apparatus sends a nonfiction message to notify the client of sending a request for stopping pushing the video stream.

In the embodiment of the present invention, the channel switching method is provided. The network buffer apparatus determines whether the buffered video stream burst in unicast is synchronous with the video stream of the channel sent from the network node to the client in multicast, so as to implement fast channel switching, and dynamically adjusts the speed of pushing the video stream in unicast, so that the number of concurrent connections of the client and the channel switching efficiency are increased, and the deployment and operation cost of an IPTV system is decreased. In this case, the channel switching scheme achieves universality and expandability, and the level of user experience is improved.

Figure 1B:
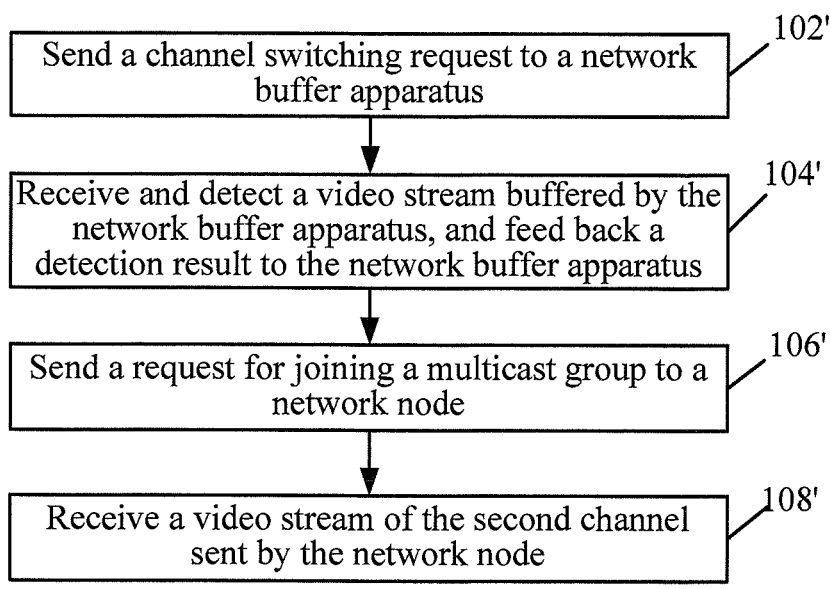
FIG. 1b is a flow chart of a channel switching method according to an embodiment of the present invention.

FIG. 1b is a flow chart of another channel switching method according to an embodiment of the present invention. The channel switching method includes the following steps.

Step 102': Send a channel switching request for switching from a first channel to a second channel to a network buffer apparatus.

Step 104': Receive and detect a buffered video stream of the second channel sent by the network buffer apparatus, and feed back a detection result to the network buffer apparatus, so that the network buffer apparatus dynamically adjusts a sending speed of sending the buffered video stream to a client according to the detection result.

The detection result includes any combination of loss information of a received video stream, a sending speed of the network buffer apparatus requested by the client, and an increment of the sending speed. The detailed explanation is as follows. The detection result fed back by the client is analyzed to determine whether to increase or decrease the sending speed of sending a buffered media stream to the client. For example, a packet loss rate in a sending process is known according to information in the detection result, such as no packet loss, packet loss, lost packet information or statistics, and a sequence number of a lost packet. If the packet loss rate is high, the network resources are insufficient, or fewer remaining buffer areas of the client exist, the sending speed is decreased; while if the packet loss does not occur, the bandwidth resources are sufficient, and fewer remaining buffer areas of the client exist, the sending speed is increased, so that the network resources are fully utilized, and the time for sending the packet is shortened, thereby reducing the time for the network buffer apparatus to process fast channel switching of a single user, increasing the concurrent number of the network buffer apparatus, and improving the level of user experience. Alternatively, the dynamical adjustment may be performed according to a suggested sending speed fed back from the client. The adjustment may also be performed according to an increment or a decrement of the suggested sending speed or the invariable sending speed fed back from the client. The speed may also be dynamically adjusted according to any combination of the foregoing situations.

Step 106': Send a request for joining a multicast group of the second channel to a network node.

Here, the client may actively send the request for joining the multicast group to the network node, or after the network buffer apparatus notifies the client of sending a message for joining the multicast group, the client may send the request for joining the multicast group to the network node.

Step 108': Receive a video stream of the second channel sent by the network node.

After receiving the request for joining the multicast group, the network node notifies the network buffer apparatus of a sequence number of a packet in the video stream of the channel to be sent to the client. If the network buffer apparatus detects and finds that a packet not sent between a packet of the buffered video stream sent to the client and the video stream of the channel to be sent by the network node exists, the network buffer apparatus sends the packet of the buffered video stream not yet sent at a low speed.

If the network node cannot notify the network buffer apparatus, when the client detects that packet loss occurs between the video stream of the channel being received and the buffered video stream received before, the client requests the network buffer apparatus to re-send the packet not sent.

When the client switches from the second channel to a third channel, the client receives a video stream of the third channel sent by the network buffer apparatus at the adjusted sending speed, in which the adjusted sending speed is obtained according to a sending speed carried in the channel switching request or obtained according to local storage of the network buffer apparatus.

In the embodiment of the present invention, the client detects a situation of receiving the packet and feeds back a situation of receiving a multicast IP packet to the network buffer apparatus, so that the network buffer apparatus dynamically adjusts the sending speed, the network resources are fully utilized, and the time for sending the packet is shortened, thereby reducing a delay of channel switching, decreasing the deployment and operation cost of an IPTV system, enhancing the universality and expandability of the channel switching scheme, and improving the level of user experience.

Figure 2:
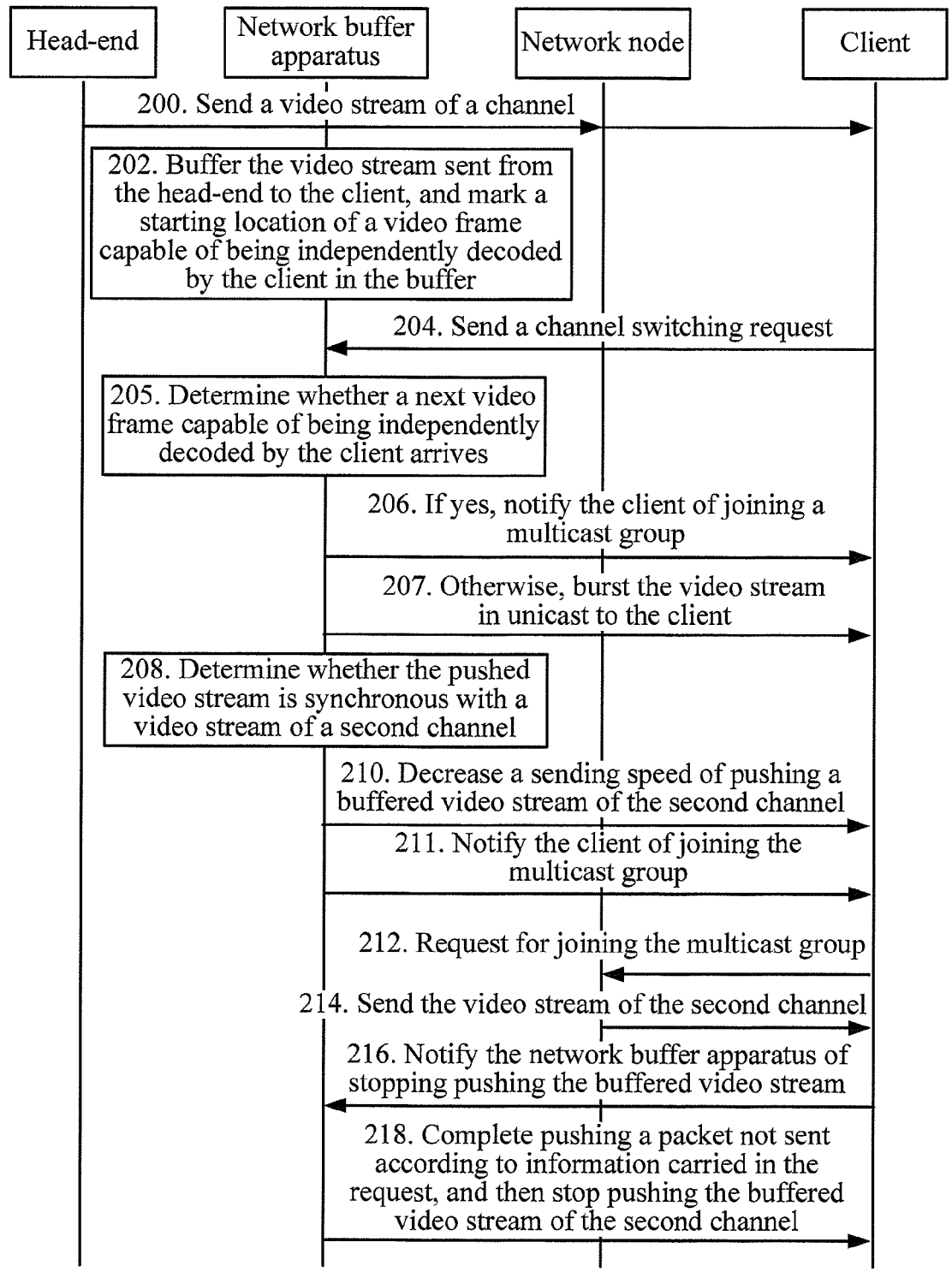
FIG. 2 is a flow chart of a specific implementation method of channel switching according to an embodiment of the present invention.

FIG. 2 is a flow chart of a specific implementation method of channel switching according to an embodiment of the present invention. The method includes the following steps.

Step 200: A head-end sends a video stream of a channel to a client.

The head-end is a source apparatus initiating a media stream of the channel, and the types of the head-end may include a multicast source, a media server, a center media server, and an edge media server. A mode for the head-end to obtain a media stream includes recording from a satellite television or forwarding from other wired networks. The network node includes apparatuses deployed by an operator, such as a DSLAM apparatus, an OLT apparatus, a router apparatus, a network access server, and an IP switch. The network connection between the head-end and the network node may be implemented through a core network, an MAN, or an aggregation network, or by other networking means.

Step 202: A network buffer apparatus buffers the video stream sent from the head-end to the client, and marks a starting location of a video frame capable of being independently decoded by the client in the buffer, such as an I frame location or IDR frame location.

When the head-end apparatus sends the video stream to the client (which can be understood as when the head-end sends the video stream to the client through the network node), the network buffer apparatus obtains and buffers the video stream, or when the head-end sends the video stream to the client, the network buffer apparatus obtains and buffers the video stream by mirroring, in which the video stream is a code stream of the channel provided for a user.

Step 204: The client sends a channel switching request to the network buffer apparatus.

When the user intends to switch the channel, the client sends the channel switching request to the network node to request switching from a first channel to a second channel. The channel switching request may use an RTCP protocol, an RTCP extension protocol, or other dedicated or private protocols or signaling.

Step 205: After receiving the channel switching request of the client, the network buffer apparatus determines whether a next video frame capable of being independently decoded by the client arrives, and if the next video frame capable of being independently decoded by the client arrives, step 206 is performed, in which the network buffer apparatus directly notifies the client of joining a multicast group; and if the next video frame capable of being independently decoded by the client does not arrive, step 207 is performed.

Specifically, it is determined whether a next buffered video stream capable of being independently decoded by the client is about to arrive.

Step 206: If the next buffered video stream capable of being independently decoded by the client is about to arrive, the client is directly notified of joining the multicast group.

Step 207: The network buffer apparatus bursts the buffered video stream in unicast to the client.

After querying a closest packet capable of being independently decoded by a terminal, the network buffer apparatus bursts the buffered video stream in unicast to the client.

The network buffer apparatus queries the packet that is closest to the buffered video stream and capable of being independently decoded by the client. Because different video encoding technologies exist, the channel content may be encoded through MPEG2, MPEG4, H.264, or even SVC, and a transport encapsulation format of the channel content may be MPEG2 TS encapsulation or NAL encapsulation. In the embodiment of the present invention, the closest packet capable of being independently decoded by the client may be distinguishably defined for different encoding technologies and different transport encapsulation formats. For example, for an MPEG2 TS encapsulated video, the packet capable of being independently decoded by the client may be defined as a GOP starting packet.

When the buffered video stream is burst in unicast (here, the buffered video stream is the buffered video stream of the second channel, which is called the buffered video stream for short in the following), a sending speed of pushing the buffered video stream to the client can be dynamically adjusted according to feedback of the client, that is, a current pushing speed is increased or decreased according to information such as a current packet loss rate fed back by the client, which will be described in detail in the following embodiment.

Here, the network buffer apparatus bursts the buffered video stream in unicast to the client, which is not only applicable to an application scenario that the client and a network node are directly connected, but also applicable to an application scenario that other intermediate nodes exist between the client and the network node, so as to prevent a situation that when the other intermediate nodes exist between the client and the network node, the buffered video stream is pushed to the client by other means, resulting in the failure to push the buffered video stream to the client.

Step 208: The network buffer apparatus determines whether the pushed buffered video stream is synchronous with a video stream of the second channel.

Specifically, the network buffer apparatus determines whether the buffered video stream burst in unicast is synchronous with the video stream of the second channel being sent from the network node to other clients.

If the pushed buffered video stream is synchronous with the video stream of the second channel being sent from the network node to the other clients, steps 210 to 216 are performed; while if the pushed buffered video stream is asynchronous with the video stream of the second channel being sent from the network node to the other clients, step 206 is performed.

The buffered video stream is a video stream burst in unicast by the network buffer apparatus to the client (or a unicast IP packet), and the video stream of the channel is a media stream normally sent from the network node to the client in multicast (or a multicast IP packet).

The step of determining whether the buffered video stream burst in unicast is synchronous with the video stream of the channel being sent from the network node to the other clients is critical, which is mainly directed to an application scenario that a delay exists between the buffered video stream sent from the network buffer apparatus to the client and the video stream of the channel being sent from the network node to the other clients, so when the buffered video stream burst in unicast can catch up with (that is, be synchronous with) the video stream of the channel being sent from the network node to the other clients is critical. The network buffer apparatus determines whether a video media stream sent from the network node to the other clients is caught up with, so as to accurately determine when the client joins the multicast, thereby reducing a delay of switching from the buffered video stream burst in unicast to the video media stream of the channel sent from the network node to the client in multicast.

A small amount of packet loss during the switching process from the buffered video stream to the video stream of the channel can be compensated by the following means: the client requests re-sending, or the network buffer apparatus continues pushing the buffered video stream in unicast at a lower speed for a period of time. In the process of compensating the packet loss, the client receives two multimedia data streams. Because the process lasts for a short time, the pushed buffered media stream occupies small space, and the pushing speed is low, and the bandwidth between the client and the network node may not be affected. The specific process will be described in detail in FIG. 3.

Step 210: The network buffer apparatus decreases the sending speed of pushing the buffered video stream of the second channel to the client.

Step 210 may also be performed after step 211, that is, before a notification message is sent to the client, the sending speed of pushing the buffered video stream of the second channel to the client is decreased, or after the notification message is sent, the sending speed of pushing the buffered video stream of the second channel is decreased.

Step 211: The network buffer apparatus notifies the client of sending a request of joining the multicast group to the network node.

The notification message carries any one or a combination of address information of the multicast group of the second channel, time information for joining the second channel, and time information for requesting stopping pushing the video stream. For example, a time parameter is contained to indicate initiating multicast joining after that time. If the time is 0, it indicates that the client intends to join the multicast group at once.

The notification message also includes notifying the client of sending a request for stopping pushing the video stream.

Step 212: The client sends the request for joining the multicast group to the network node.

Step 214: The network node sends the video stream of the second channel to the client according to the request for joining the multicast group, so that the client obtains the video stream of the second channel in multicast.

Step 216: The client receives the message and notifies the network buffer apparatus of stopping sending a message of pushing the buffered video stream.

After receiving the video stream of the channel, the client sends the request for stopping pushing the video stream, in which the request carries information capable of confirming a packet not sent between a multicast video stream of the second channel and the buffered video stream of the second channel received by the client, for example, a sequence number of a first packet in the video stream of the second channel, or other information capable of confirming a packet location. When the pushed buffered video stream reaches the sequence number of the first packet or other locations capable of confirming a sent multicast IP packet, the buffered video stream is stopped from being pushed.

Step 218: The network buffer apparatus completes pushing the packet not sent according to the information capable of confirming the packet not sent between the multicast video stream of the second channel and the buffered video stream of the second channel received by the client carried in the request, and then stops pushing the buffered video stream of the second channel.

It should be noted that, in the embodiment of the present invention, the network buffer apparatus does not limit the technical solutions of the present invention, an apparatus capable of implementing the channel switching function may be, but not limited to, the network buffer apparatus, and may also include an apparatus located at other network locations, or may be embedded in the network node, and the process for the apparatus to implement the channel switching method is the same as the foregoing process.

The embodiment of the present invention provides the channel switching method. The network buffer apparatus determines whether the buffered video stream burst in unicast is synchronous with the video stream of the channel pushed from the network node to the client in multicast, so as to implement fast channel switching, and dynamically adjusts the speed of pushing the video stream in unicast, so that the number of concurrent connections of the client and the channel switching efficiency are increased, and the deployment and operation cost of an IPTV system is decreased. In this case, the channel switching scheme achieves universality and expandability, and the level of user experience is improved.

Figure 3:
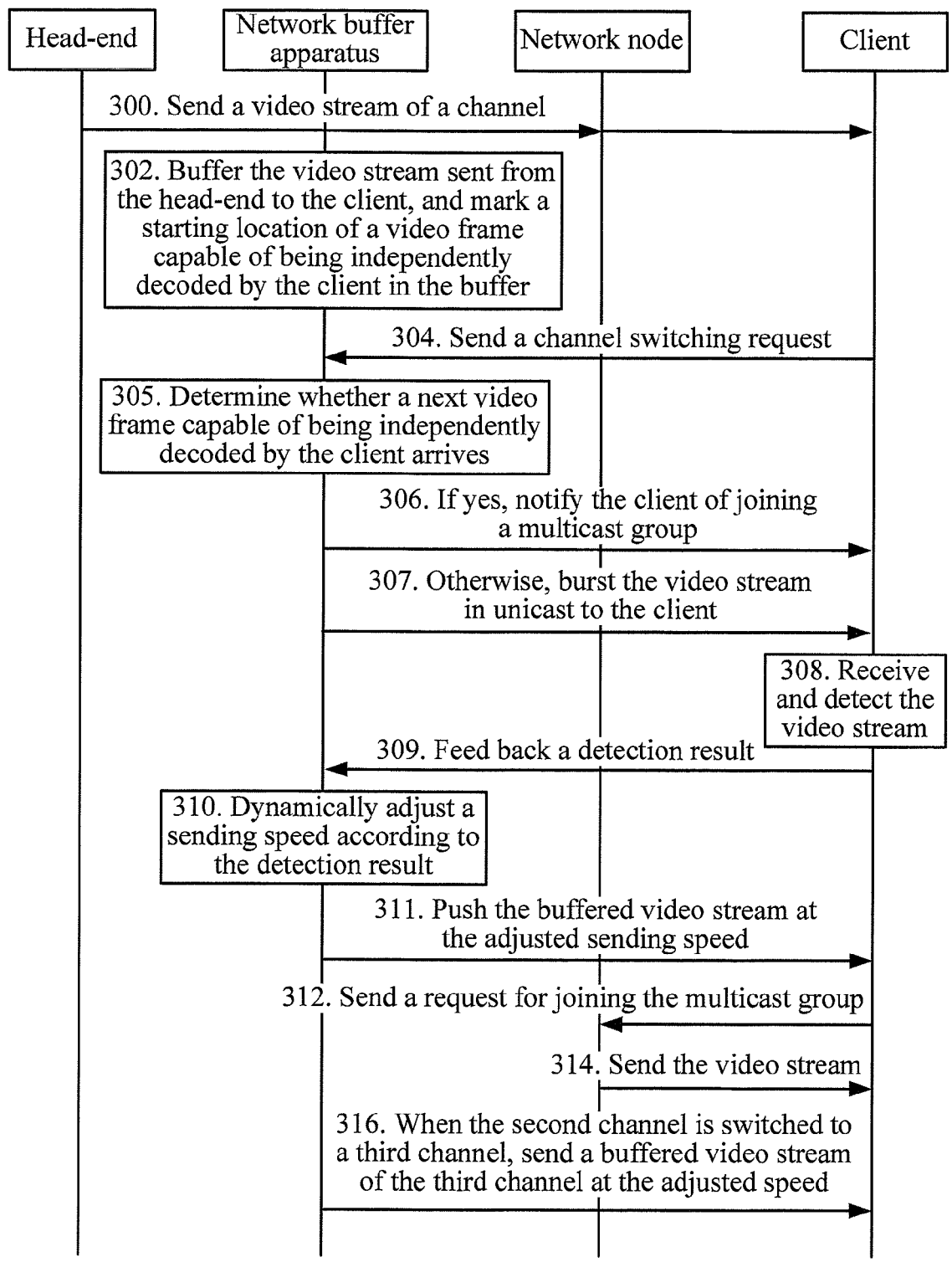
FIG. 3 is a flow chart of another specific implementation method of channel switching according to an embodiment of the present invention.

FIG. 3 is a flow chart of another specific implementation method of channel switching according to an embodiment of the present invention, and in detail describes an application scenario that a small amount of packet loss occurs when a client switches from a video stream buffered by a network buffer apparatus to a video stream of a channel obtained from a network node. The method includes the following steps.

Steps 300 to 307 are the same as steps 200 to 207 in FIG. 2 according to the embodiment of the present invention. The detailed steps can refer to the foregoing description, and will not be specifically illustrated herein again.

Step 308: The client receives the buffered video stream burst in unicast by the network buffer apparatus, and then detects the video stream.

Specifically, the network buffer apparatus sends the buffered video stream of the second channel to the client according to the channel switching request for switching from the first channel to the second channel sent by the client, and the client determines whether a packet is lost by detecting a sequence number of the received video stream, obtains a sequence number of the lost packet in the received video stream, and feeds back a detection result to the network buffer apparatus, in which the detection result is any combination of information such as the sequence number of the lost packet, the size of a current remaining buffer area of the client, and a utilization rate of network bandwidth.

Here, after receiving the buffered video stream, the client may actively feed back the any combination of the information such as the sequence number of the lost packet, the size of the current remaining buffer area of the client, and the utilization rate of the network bandwidth to the network buffer apparatus, or the network buffer apparatus sends a message to the client to notify the client of returning information relevant to the video stream of the channel.

Step 309: The client feeds back the detection result to the network buffer apparatus.

Step 310: The network buffer apparatus dynamically adjusts a sending speed of sending the buffered video stream to the client according to the detection result.

Specifically, the detection result fed back by the client is analyzed to determine whether to increase or decrease the current sending speed of sending a buffered media stream to the client. For example, a packet loss rate in a sending process is known according to the sequence number of the lost packet in the detection result. If the packet loss rate is high, the network resources are insufficient, or fewer remaining buffer areas of the client exist, the sending speed is decreased; while if the packet loss does not occur, the bandwidth resources are sufficient, and fewer remaining buffer areas of the client exist, the sending speed is increased, so that the network resources are fully utilized, and the time for sending the packet is shortened, thereby reducing the time for the network buffer apparatus to process fast channel switching of a single user, increasing the concurrent number of the network buffer apparatus, and improving the level of user experience.

Step 311: The network buffer apparatus pushes the video stream of the channel to the client at the adjusted speed.

Step 312: The client sends a request for joining the multicast group to the network node.

Here, the client may actively send the request for joining the multicast group to the network node, or after the network buffer apparatus notifies the client of sending a message for joining the multicast group, the client sends the request for joining the multicast group to the network node. If it is the situation that the network buffer apparatus notifies the client of sending the message for joining the multicast group, the specific process can refer to steps 208 and 210 in FIG. 2 according to the embodiment of the present invention. Here, a method combining FIGS. 2 and 3 is an optimal embodiment of the present invention.

Step 314: The network node sends the video stream of the second channel to the client according to the request.

The specific steps are as follows. After receiving the request for joining the multicast group, the network node notifies the network buffer apparatus of a sequence number of a packet in the video stream of the channel to be sent to the client. If the network buffer apparatus detects and finds that a packet not sent between a packet of the buffered video stream sent to the client and the video stream of the channel to be sent by the network node exists, the network buffer apparatus sends a packet of the buffered video stream not yet sent at a low speed.

If the network node cannot notify the network buffer apparatus, when the client detects that packet loss occurs between the video stream of the channel being received and the buffered video stream received before, the client requests the network buffer apparatus to re-send the packet not sent.

Step 316: When the client switches from the second channel to a third channel, the client receives a video stream of the third channel sent by the network buffer apparatus at the adjusted sending speed, in which the adjusted sending speed is obtained according to a sending speed carried in the channel switching request or obtained according to local storage of the network buffer apparatus.

It should be noted that, in the embodiment of the present invention, the network buffer apparatus does not limit the technical solutions of the present invention, an apparatus capable of implementing the channel switching function may be, but not limited to, the network buffer apparatus, and may also include an apparatus located at other network locations, or may be embedded in the network node, and the process for the apparatus to implement the channel switching method is the same as the foregoing process.

In the embodiment of the present invention, the client detects a situation of receiving the packet and feeds back a situation of receiving a multicast IP packet to the network buffer apparatus, so that the network buffer apparatus dynamically adjusts the sending speed, the network resources are fully utilized, and the time for sending the packet is shortened, thereby reducing a delay of channel switching, decreasing the deployment and operation cost of an IPTV system, enhancing the universality and expandability of the channel switching scheme, and improving the level of user experience.

Figure 4:
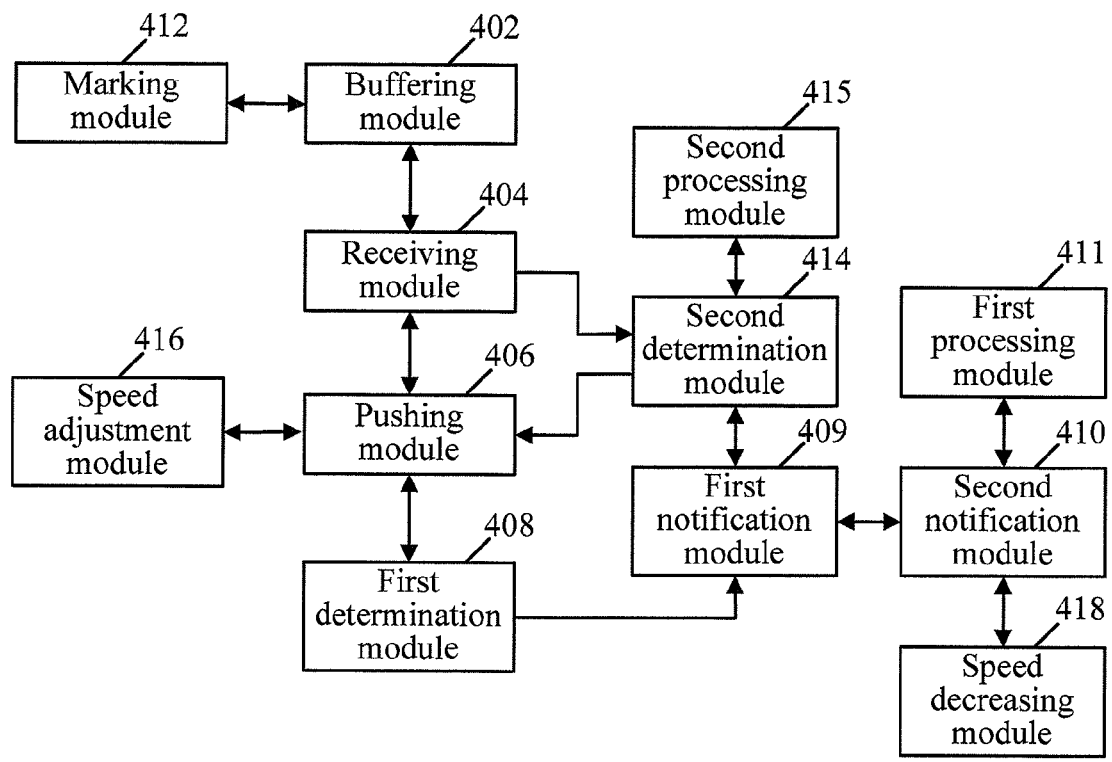
FIG. 4 is a structural diagram of a channel switching device according to an embodiment of the present invention.

FIG. 4 is a structural diagram of a channel switching device according to an embodiment of the present invention. The channel switching device includes a buffering module 402, a receiving module 404, a pushing module 406, a first determination module 408, and a first notification module 409.

The buffering module 402 is configured to buffer a video stream of a channel.

Specifically, the buffering module 402 is configured to receive video streams of all channels sent from a head-end apparatus to a client, set buffer space for each channel, and buffer the video stream of each channel. Only one piece of data may be buffered for a packet of each channel. Because the buffer space of each channel is independent, when a fast channel switching service is provided for a user, different starting points for reading the buffered video stream do not affect reading of the buffered video stream when the fast channel switching service is provided for other users.

The receiving module 404 is configured to receive a channel switching request for switching from a first channel to a second channel sent by the client.

When the user intends to switch the channel, the client sends the channel switching request to a network node to request switching from the first channel to the second channel required by the user. The channel switching request may use an RTCP protocol, an RTCP extension protocol, or other dedicated or private protocols or signaling.

The pushing module 406 is configured to push a video stream of the second channel buffered by the buffering module 402 to the client according to the channel switching request sent by the receiving module 404.

Specifically, the pushing module 406 is configured to receive the channel switching request sent by the client, and push to the client the buffered video stream of the channel requested to be switched to in unicast according to a receiving order of buffered video streams. A first pushed video stream is a packet that is closest to the video stream of the channel requested by the client to be switched to and capable of being independently decoded by the client, for example, a GOP starting packet (that is, an I frame) or a Program Association Table/Program Map Table (PAT/PMT) packet.

Here, the network buffer apparatus bursts the buffered video stream in unicast to the client, which is not only applicable to an application scenario that the client and a network node are directly connected, but also applicable to an application scenario that other intermediate nodes exist between the client and the network node, so as to prevent a situation that when the other intermediate nodes exist between the client and the network node, the buffered video stream is pushed to the client by other means, resulting in the failure to push the buffered video stream to the client.

The first determination module 408 is configured to determine whether the buffered video stream pushed by the pushing module 406 is synchronous with the video stream of the second channel.

The buffered video stream is a video stream burst in unicast by the network buffer apparatus to the client (or a unicast IP packet), and the video stream of the channel is a media stream normally sent from the network node to the client in multicast (or a multicast IP packet).

The step of determining whether the buffered video stream burst in unicast is synchronous with the video stream of the channel being sent from the network node to other clients is critical, which is mainly directed to an application scenario that a delay exists between the buffered video stream sent from the network buffer apparatus to the client and the video stream of the channel being sent from the network node to the other clients, so when the buffered video stream burst in unicast can catch up with (that is, be synchronous with) the video stream of the channel being sent from the network node to the other clients is critical. The network buffer apparatus determines whether a video media stream sent from the network node to the other clients is caught up with, so as to accurately determine when the client joins the multicast group, thereby reducing a delay of switching from the buffered video stream burst in unicast to the video media stream of the channel sent from the network node to the client in multicast.

The first notification module 409 is configured to send a notification message to the client to notify the client of sending a request for joining a multicast group of the second channel, when the determination module determines that the pushed buffered video stream is synchronous with the video stream of the second channel.

The notification message carries any one or a combination of address information of the multicast group of the second channel, time information for joining the second channel, and time information for requesting stopping pushing the video stream. For example, at least one time parameter is contained to indicate initiating multicast joining after that time. If the time is 0, it indicates that the client intends to join the multicast group at once.

The device further includes a marking module 412, connected to the buffering module 402, and configured to set a packet mark for the video stream buffered by the buffering module, to mark a starting location of the video stream capable of being independently decoded by a terminal in a buffer, such as an I frame location or IDR frame location.

The device also includes a second notification module 410, a first processing module 411, and a speed decreasing module 418.

The second notification module 410 is configured to notify the client of sending a request for stopping pushing the video stream.

The first processing module 411 is configured to stop pushing the buffered video stream to the client after receiving the request for stopping pushing the buffered video stream sent by the client, in which the message of stopping sending the buffered video stream returned by the client carries information capable of confirming a packet not sent between the multicast video stream of the second channel and the buffered video stream of the second channel received by the client. For example, the network node notifies the network buffer apparatus of a sequence number of a packet in the video stream of the channel to be sent to the client. If the network buffer apparatus detects and finds that a packet not sent between a packet of the buffered video stream sent to the client and the video stream of the channel to be sent by the network node exists, the network buffer apparatus sends the packet of the buffered video stream not yet sent at a low speed.

The speed decreasing module 418 is configured to decrease a sending speed of pushing the buffered video stream of the second channel to the client before the second notification module notifies the client of sending the request for stopping pushing the video stream.

When the device is configured to determine whether a next buffered video stream capable of being independently decoded by the client is about to arrive, the device also includes a second determination module 414.

The second determination module 414 is configured to determine whether a next video frame capable of being independently decoded by the client is about to arrive, and send a determination result to a second processing module 415 for processing.

The second processing module 415 is configured to directly notify the client of joining the multicast group if the second determination module 414 determines that the next video frame capable of being independently decoded by the client arrives, and send the channel switching request sent by the receiving module 404 to the pushing module 406 for further processing if the second determination module 414 determines that the next video frame capable of being independently decoded by the client does not arrive.

The channel switching device also includes a speed adjustment module 416, connected to the pushing module 406, and configured to dynamically adjust the sending speed of pushing the buffered video stream to the client in unicast according to the feedback of the client.

It should be noted that, in the embodiment of the present invention, the channel switching device does not limit the technical solutions of the present invention, and the channel switching device may be, but not limited to, the network buffer apparatus, may also include an apparatus located at other network locations, or may be embedded in the network node, and can implement the same function as the foregoing function.

The embodiment of the present invention provides the channel switching device, which adopts a method for bursting the buffered video stream in unicast. The network buffer apparatus determines whether the buffered video stream burst in unicast is synchronous with the video stream of the channel pushed from the network node to the client in multicast, so as to implement fast channel switching, so that the number of concurrent connections of the client and the channel switching efficiency are increased, and the deployment and operation cost of an IPTV system is decreased. In this case, the channel switching scheme achieves universality and expandability, and the level of user experience is improved.

Figure 5:
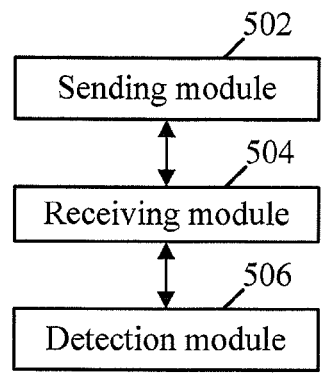
FIG. 5 is a specific structural diagram of a channel switching device according to an embodiment of the present invention.

FIG. 5 is a structural diagram of another channel switching device according to an embodiment of the present invention. The channel switching device includes a sending module 502, a receiving module 504, and a detection module 506.

The sending module 502 is configured to send a channel switching request to a network buffer apparatus to request switching from a first channel to a second channel, or send a request for joining a multicast group of the second channel to a network node.

The receiving module 504 is configured to receive a video stream of the second channel buffered by the network buffer apparatus according to the channel switching request sent by the sending module, or receive a video stream of the second channel sent by the network node according to the request for joining the multicast group sent by the sending module.

The detection module 506 is configured to detect the received video stream after the receiving module 504 receives the video stream buffered by the network buffer apparatus, and feed back a detection result to the network buffer apparatus, so that the network buffer apparatus dynamically adjusts a sending speed of sending the buffered video stream to a client according to the detection result.

Specifically, after the buffered video stream is received, the detection result obtained by detecting the received buffered video stream is fed back to the network buffer apparatus, in which the detection result includes any combination of loss information of the received video stream, the sending speed of the network buffer apparatus requested by the client, and an increment of the sending speed.

Here, after receiving the buffered video stream, the client may actively feed back the any combination of the information such as the sequence number of the lost packet, the size of the current remaining buffer area of the client, and the utilization rate of the network bandwidth to the network buffer apparatus, or the network buffer apparatus sends a message to the client to notify the client of returning information relevant to the video stream of the channel.

After receiving the detection result fed back by the client, the network buffer apparatus analyzes the detection result to determine whether to increase or decrease the current sending speed of sending the buffered media stream to the client. For example, a packet loss rate in a sending process is known according to the sequence number of the lost packet in the detection result. If the packet loss rate is high, the network resources are insufficient, or fewer remaining buffer areas of the client exist, the sending speed is decreased; while if the packet loss does not occur, the bandwidth resources are sufficient, and fewer remaining buffer areas of the client exist, the sending speed is increased, so that the network resources are fully utilized, and the time for sending the packet is shortened, thereby reducing the time for the network buffer apparatus to process fast channel switching of a single user, increasing the concurrent number of the network buffer apparatus, and improving the level of user experience.

The sending module 502 is also configured to send the request for joining the multicast group to the network node according to a notification of the request for joining the multicast group sent by the network buffer unit.

Here, the sending module may actively send the request for joining the multicast group to the network node, or after the network buffer apparatus notifies the sending module of sending a message for joining the multicast group, the sending module may send the request for joining the multicast group to the network node.

The receiving module 504 is also configured to receive a video stream of a third channel sent by the network buffer apparatus at the adjusted sending speed when the second channel is switched to the third channel, in which the adjusted sending speed is obtained according to a sending speed carried in the channel switching request or obtained according to local storage of the network buffer apparatus.

It should be noted that, the channel switching device is applicable to the client or other network apparatuses.

The channel switching device according to the embodiment of the present invention detects a situation of receiving the packet and feeds back a situation of receiving a multicast IP packet to the network buffer apparatus, so that the network buffer apparatus dynamically adjusts the sending speed, the network resources are fully utilized, and the time for sending the packet is shortened, thereby reducing a delay of channel switching, decreasing the deployment and operation cost of an IPTV system, enhancing the universality and expandability of the channel switching scheme, and improving the level of user experience.

Figure 6:
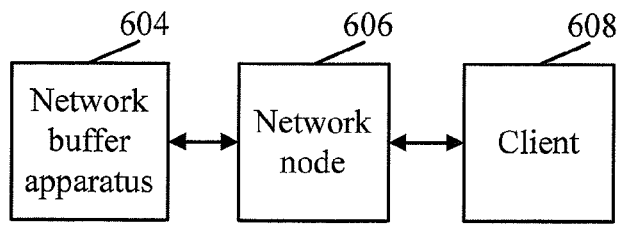
FIG. 6 is a structural diagram of a channel switching system according to an embodiment of the present invention.

FIG. 6 is a structural diagram of a channel switching system according to an embodiment of the present invention. The channel switching system includes a network buffer apparatus 604, a network node 606, and a client 608.

The network buffer apparatus 604 is configured to buffer a video stream of a channel; receive a channel switching request for switching from a first channel to a second channel sent by the client; push a buffered video stream of the second channel to the client according to the channel switching request; and determine whether the pushed buffered video stream is synchronous with a video stream of the second channel, and send a notification message to the client to notify the client of sending a request for joining a multicast group of the second channel if the pushed buffered video stream is synchronous with the video stream of the second channel.

The buffered video stream of the channel is a video stream sent from a multicast source to the client. The multicast source is a head-end apparatus, that is, a source apparatus initiating a channel media stream. A mode for the multicast source to obtain the video stream includes recording from a satellite television or forwarding from other wired networks.

The network node 606 is configured to send the video stream of the second channel to the client according to the request for joining the multicast group sent by the client.

The client 608 is configured to send the channel switching request to the network buffer apparatus, receive the buffered video stream pushed by the network buffer apparatus, and send the request for joining the multicast group of the second channel to the network node according to a notification from the network buffer apparatus to request joining the multicast group.

In the structural diagram of the channel switching system in FIG. 6, the network buffer apparatus 604 is also configured to receive a detection result fed back by the client and dynamically adjust a sending speed of sending the buffered video stream to the client.

The client 606 is also configured to receive and detect the buffered video stream of the second channel sent by the network buffer apparatus 604, and feed back the detection result to the network buffer apparatus 604.

When the received buffered video stream is synchronous with the video stream of the second channel, the request for joining the multicast group is sent to the network node, and the video stream of the channel sent by the network node is received.

The embodiment of the present invention provides the channel switching system. The network buffer apparatus determines whether the buffered video stream burst in unicast is synchronous with the video stream of the channel pushed from the network node to the client in multicast, so as to implement fast channel switching, and dynamically adjusts the speed of pushing the video stream in unicast, so that the number of concurrent connections of the client and the channel switching efficiency are increased, and the deployment and operation cost of an IPTV system is decreased. In this case, the channel switching scheme achieves universality and expandability, and the level of user experience is improved.

Through the above description of the implementation, it is clear to persons skilled in the art that the present invention may be accomplished through hardware, or through software plus a necessary universal hardware platform. Based on this, the above technical solutions or the part that makes contributions to the prior art can be substantially embodied in the form of a software product. The computer software product may be stored in a storage medium and contain several instructions to instruct a terminal apparatus (for example, a cell phone, a personal computer, a server, or a network equipment) to perform the method described in the embodiments of the present invention.

The above descriptions are merely exemplary embodiments of the present invention. It should be noted by persons of ordinary skill in the art that modifications and improvements may be made without departing from the principle of the present invention, which should be construed as falling within the protection scope of the present invention.

What is claimed is:

1. A channel switching method, comprising:
   sending a channel switching request to a network buffer apparatus to request switching from a first channel to a second channel;
   receiving and detecting a unicast video stream of the second channel sent by the network buffer apparatus, and feeding back a detection result to the network buffer apparatus, so that the network buffer apparatus dynamically adjusts a sending speed of sending the unicast video stream to a client according to the detection result, the detection result comprising a sending speed of the network buffer apparatus requested by the client;
   sending a request for joining a multicast group of the second channel to a network node;
   receiving a multicast video stream of the second channel sent by the network node; and
   sending a message to the network buffer apparatus, wherein the message comprises a sequence number of a first packet in the received multicast video stream, the sequence number is used for the network buffer apparatus to determine an end of the unicast video stream.

2. The method according to claim 1, wherein the detection result further comprises an increment of the sending speed of the network buffer apparatus.

3. The method according to claim 1, wherein sending the request for joining the multicast group of the second channel to the network node comprises:
   sending the request for joining the multicast group to the network node according to a notification of the request for joining the multicast group sent by the network buffer apparatus.

4. The method according to claim 1, further comprising:
   when switching from the second channel to a third channel, receiving a video stream of the third channel sent by the network buffer apparatus at an adjusted sending speed, wherein the adjusted sending speed is obtained according to a sending speed carried in a channel switching request or obtained according to local storage of the network buffer apparatus.

5. A channel switching device, comprising:
   a sending module, configured to send a channel switching request to a network buffer apparatus to request switching from a first channel to a second channel;
   a receiving module, configured to receive a unicast video stream of the second channel sent by the network buffer apparatus according to the channel switching request sent by the sending module;
   a detection module, configured to detect the unicast video stream, and feed back a detection result to the network buffer apparatus, so that the network buffer apparatus dynamically adjusts a sending speed of sending the unicast video stream to the channel switching device according to the detection result, the detection result comprising a sending speed of the network buffer apparatus requested by the channel switching device;
   wherein,
   the sending module is further configured to send a request for joining a multicast group of the second channel to a network node;
   the receiving module is further configured to receive a multicast video stream of the second channel sent by the network node according to the request for joining the multicast group sent by the sending module; and
   the sending module is further configured to send a message to the network buffer apparatus, wherein the message comprises a sequence number of a first packet in the received multicast video stream, the sequence number is used for the network buffer apparatus to determine an end of the unicast video stream.

6. The device according to claim 5, wherein the detection result further comprises an increment of the sending speed of the network buffer apparatus.

7. The device according to claim 5, wherein the sending module is configured to send the request for joining the multicast group to the network node according to a notification of the request for joining the multicast group sent by the network buffer apparatus.

8. The device according to claim 5, wherein the receiving module is further configured to:
   receive a video stream of a third channel sent by the network buffer apparatus at an adjusted sending speed when switching from the second channel to the third channel, wherein the adjusted sending speed is obtained according to a sending speed carried in a channel switching request or obtained according to local storage of the network buffer apparatus.

9. A channel switching system, comprising a network buffer apparatus and a client, wherein
   the client is configured to:

send a channel switching request to the network buffer apparatus to request switching from a first channel to a second channel;

receive and detect a unicast video stream of the second channel sent by the network buffer apparatus, and feed back a detection result to the network buffer apparatus, so that the network buffer apparatus dynamically adjusts a sending speed of sending the unicast video stream to the client according to the detection result, the detection result comprising a sending speed of the network buffer apparatus requested by the client;

send a request for joining a multicast group of the second channel to a network node;

receive a multicast video stream of the second channel sent by the network node; and send a message to the network buffer apparatus, wherein the message comprises a sequence number of a first packet in the received multicast video stream, the sequence number is used for the network buffer apparatus to determine an end of the unicast video stream;

the network buffer apparatus is configured to:

buffer the video stream of the second channel;

receive the channel switching request sent by the client;

push the unicast video stream of the second channel to the client according to the channel switching request;

receive the detection result fed back from the client, and dynamically adjust a sending speed of sending the unicast video stream to the client;

receive the message comprising the sequence number of the first packet in the received multicast video stream, the sequence number being used for the network buffer apparatus to determine the end of the unicast video stream;

determine an end packet; and send the unicast video stream of the second channel until the end packet is sent.

10. The system according to claim 9, wherein the client is configured to send the request for joining the multicast group to the network node according to a notification of the request for joining the multicast group sent by the network buffer apparatus.

11. The system according to claim 9, wherein the detection result further comprises an increment of the sending speed of the network buffer apparatus.

\* \* \* \* \*